(12) United States Patent
Bentkofsky et al.

(10) Patent No.: US 8,788,505 B2
(45) Date of Patent: Jul. 22, 2014

(54) SYSTEMS AND METHODS FOR A CACHE-SENSITIVE INDEX USING PARTIAL KEYS

(75) Inventors: Michael Bentkofsky, Falls Church, VA (US); Florent Guiliani, Fribourg (CH)

(73) Assignee: Verisign, Inc, Reston, VA (US)

( * ) Notice: Subject to any disclaimer, the term of this patent is extended or adjusted under 35 U.S.C. 154(b) by 253 days.

(21) Appl. No.: 13/094,942

(22) Filed: Apr. 27, 2011

(65) Prior Publication Data

US 2012/0278335 A1    Nov. 1, 2012

(51) Int. Cl.
G06F 17/30    (2006.01)

(52) U.S. Cl.
CPC .................. *G06F 17/30327* (2013.01)
USPC ........................................... 707/743

(58) Field of Classification Search
CPC ................................. G06F 17/30327
USPC ........................................... 707/743
See application file for complete search history.

(56) References Cited

U.S. PATENT DOCUMENTS

| | | | |
|---|---|---|---|
| 6,711,562 B1 | 3/2004 | Ross et al. | |
| 2003/0033328 A1 | 2/2003 | Cha et al. | |
| 2003/0204513 A1 | 10/2003 | Bumbulis | |

FOREIGN PATENT DOCUMENTS

EP    2 270 680    1/2011

OTHER PUBLICATIONS

Raatikka, Vilho, "Cache-Conscious Index Structures for Main-Memory Databases", University of Helsinki, Department of Computer Science, Feb. 4, 2004, pp. 1-78, (88 pages).
Bohannon, Philip et al., "Main-Memory Index Structures with Fixed-Size Partial Keys", ACM SIGMOD, May 21-24, 2001 (12 pages).
Zubrzycki Wobcieh, Authorized Officer. International Search Report and Written Opinion dated Nov. 18, 2013 from International Application No. PCT/US2012/035109, pp. 1-11.
Bohannon; Philip at al. Main-Memory Index Structures with Fixed-Size Partial Keys. ACM Proceedings of Sigmod, International Conference on Management of Data, Apr. 1, 2011, pp. 163-174.
Rao, Jun et al. Making B+-Trees Cache Conscious in Main Memory. ACM Proceedings of Sigmod, International Conference on Management of Data, May 1, 2000, pp. 475-486.
Chilimbi, Trishul M. et al. Cache-Conscious Structure Layout. Proceedings of the ACM Sigplan '99 Conference on Programming Language Design and Implementation, Atlanta, Georgia, May 1-4, 1999, pp. 1-12.

*Primary Examiner* — Huawen Peng
(74) *Attorney, Agent, or Firm* — MH2 Technology Law Group, LLP

(57) ABSTRACT

Systems and methods are disclosed for a cache-sensitive index that uses fixed-size partial keys. The index may include a node comprising a child group pointer, a number of partial keys and a similar number of full-key pointers. The node may also include a record count. The nodes are organized into groups. The groups may contain a number of nodes one greater than the number of partial keys in a node and the nodes in a group may be stored contiguously in memory. The child group pointer and the number of partial keys may fit within a cache line. A method is disclosed for traversing the index, for bulk-loading the index, and for live deletion of records from the index.

24 Claims, 13 Drawing Sheets

```
List L1 = Pop the stack
List L2 = Pop the stack
List L3 = new List
Lower = NULL
Higher = NULL While L1 or L2 has keys If (L1 has no more keys)
                Lower = L2
        Else If (L2 has no more keys)
                Lower = L1
        Else If ( Next Partial Key(L1) < Next Partial Key(L2))
                Lower = L1
        Else If (Next Partial Key(L2) < Next Partial Key(L1))
                Lower = L2
        Else
                // Partial keys are equal – use full key
                If (Next Key(L1) < Next Key(L2))
                        Lower = L1
                Else If (Next Key(L2) < Next Key(L1))
                        Lower = L2
                Else
                        // Keys are equal
                        If (should_be_unique)
                                Error: keys must be unique
                        Else
                                Lower = L1
        If (Lower is L1)
                Higher = L2
        Else
                Higher = L1

Append to L3 (Partial Key(Lower), Key(Lower))

If (Higher has more keys)
                If (Next Partial Key(Lower) overlaps Next Partial Key(Higher))
                        Next Partial Key(Higher) = Compute Partial Key(Next Key(Lower),
                                                                        Next Key(Higher))
        Advance Lower
Done Loop Push L3 onto Stack
```

FIG. 9

```
stack = NULL

For each LeafGroup childGroup = LeafGroup

For each LeafNode in LeafGroup
        Loop

If (stack is NULL or stack.currentLevel = stack.maxLevels)
                        stack.allocateLevel()
                        NextGroup = PreallocatedGroups[stack.currentLevel]
                        stack[stack.currentLevel].group  = NextGroup
                        stack[stack.currentLevel].nodeIndex = 0
                        stack[stack.currentLevel].slotIndex = 0
                        Goto FoundNextLevel
                End If // Go up the current stack
                stack.nextLevel()
                currentLevel = stack.getCurrentLevel();
                if (currentLevel.slotIndex = 0)
                        Goto FoundNextLevel currentGroup = currentLevel.group
                currentNode = currentGroup[currentLevel.nodeIndex]

if (currentNode.rowCount > currentLevel.slotIndex)
                        Goto FoundNextLevel
                Else
                        childGroup = currentGroup End Loop
        // Algorithm continues in FIG. 11B
```

FIG. 11A

```
// Algorithm continues from FIG. 11A

FoundNextLevel:
        topLevel = stack.getCurrentLevel()
        topGroup = topLevel.group
        topNode = topGroup.nodes[topLevel.nodeIndex]

if (topNode.children is not childGroup)

if (topLevel.nodeIndex is not 0)
                        if (topGroup is complete)
                                topLevel.group  = NextGroup
                        Else
                                nextNode(topGroup)
                End if topNode.children = childGroup
                topNode.rowCount = childGroup.numberOfNodes - 1
        End If topNode[topLevel.slotIndex].key =  GetLastKey(LeafNode)
        topNode[topLevel.slotIndex].partialKey =
                computePartialKey(GetBaseKey, GetLastKey(LeafNode))
        stack.previousLevel()
        While (stack.hasMoreLevels())

previousLevel = stack.getCurrentLevel()
                previousGroup = previousLevel.group if (previousLevel.nodeIndex + 1 < previousGroup.nodeCount)
                        nextNode(previousGroup)
                else
                        nextLevel.group = NextGroup
                        nextLevel.nodeIndex = 0 nextLevel.slotIndex = 0
                stack.previousLevel()
        End While

End For Each LeafNode in LeafGroup

ClearLink(LeafGroup)

End For Each LeafGroup
```

FIG. 11B

SYSTEMS AND METHODS FOR A CACHE-SENSITIVE INDEX USING PARTIAL KEYS

FIELD

This disclosure is generally directed to systems and methods for creating an index supporting fast main-memory database lookups and, more particularly, to systems and methods for creating a cache-sensitive index that also uses partial keys.

BACKGROUND

Relational databases store data using tables. Generally, a table in a relational database consists of data organized using columns and rows. The columns represent a particular field, such as "last name" or "ID." The rows represent data records stored in the columns, such as "Smith" and "12345." A particular table may have millions of rows of data, making a search for a particular row slow and cumbersome. To speed access to the records in a table, databases index the rows with an index structure having algorithmic search properties. Historically, relational databases have used an index structure, called a B+ tree, to provide the shortest path possible to the desired data. In a B+ tree, a search is performed from the root of the tree through intermediate nodes down to leaf nodes. The root node and the intermediate nodes are collectively known as index nodes and point to other index nodes or to the leaf nodes. The leaf nodes point directly to records in the database (the row data). A B+ tree contains copies of the keys in the nodes and has a high number of children per node, making the path from the root node to the leaf nodes short. A short path is desirable because it results in fewer accesses to a disk storing the index. Disk accesses have a much slower access time than main memory accesses, but because of the cost of main memory, the tables and indexes are generally stored on disk-type storage devices.

As main memory decreased in price databases stored in main memory became practical. Because disk accesses are not a concern of main memory databases, the index for a main memory database would optimally seek to optimize cache memory usage rather than reduce disk accesses. To accommodate this, two techniques arose to increase the search performance of the B+ tree. The first decreases the number of "down" pointers in a node by addressing groups of nodes rather than individual child nodes. In such an index, the child nodes are stored contiguously in main memory in a node group. Thus, only one pointer is needed to point to the child nodes even though the node group contains several children. The location of each child (index key) can be calculated by simple arithmetic, since the nodes contain a fixed number of bytes and are contiguous. The node groups are also organized to avoid crossing cache-lines (e.g. if a particular cache is organized in 64 byte blocks, the cache line falls between every 64 bytes). This technique allows nodes to contain more key pointers, increasing processor cache efficiency. The root group of such a cache-sensitive index contains a single node, but subsequent groups may have one node more than the keys in the parent group. A cache-sensitive index focuses on reducing pointer overhead (i.e. reducing the number of pointers) and improving space utilization so that more keys can be added to the same-sized node. This trades off search speed for update speed because updates involve copying entire groups of nodes rather than individual nodes. FIG. 1 depicts a cache-sensitive index with node groups represented by a dashed rectangle.

The second cache-conscious version of the B+ tree is a partial key index. A partial key index reduces the size of the index by only storing partial keys and not full keys in the index nodes. Each node contains a set of down pointers, which point to other nodes or to records (rows). The nodes also contain partial keys and pointers to the full key, which is located in the record itself. The partial key information includes a two-byte offset indicating at what position the partial key differs from the base key, and two bytes of data after the offset that differ from the previous key. For example, if a base key contains "ABCDEF" and the next key contains "ABEGXY", the partial key contains an offset of 2 and the 2 bytes of differing data contain "EG." Thus, the partial key only contains the position of the key that differs from the base and the two bytes of data that differ from the base. A partial key index focuses on lowering key-comparison cost rather than reducing pointer overhead. FIG. 2 represents a partial-key index.

The Domain Name System (DNS) uses a distributed network of name servers (lookup nodes) to translate text-based web addresses, such as "www.acme-co.com," to Internet protocol (IP) addresses, such as "234.562.55.3." When an Internet user requests a web address, one or more name servers process the DNS request by looking up the web address in a database of registered domains. When the name server locates the web address in the database, the IP address is sent back to the user's computing device.

Some name servers must handle millions of DNS requests each second. Furthermore, the name servers must perform the resolution quickly to enhance the user experience on the Internet. Therefore, name servers may use main-memory databases to store the records needed to successfully resolve a DNS request to allow faster access to the data. Furthermore, web addresses are added to and removed from the name server database daily. To accurately resolve a DNS request, the name server must rely on an index updated in real time.

Because the traditional DNS resolution process is vulnerable to hacking (i.e. forged DNS data), the industry has begun to implement a secure version of DNS named DNSSEC (DNS Security Extensions). DNSSEC requires each DNS lookup node to authenticate the DNS request, thus ensuring that the request will not be misdirected to a fraudulent site.

To authenticate a DNSSEC request, the lookup node must determine where the web address falls in relation to the DNS zone. Internet addresses are divided into DNS zones in a hierarchical tree-like fashion. The root zone includes all top-level international, ISO country-code, and generic domains and are serviced by root name servers. Below the root zone are top-level domains (TLDs), such as ".com," ".net," and ".org." The TLDs may be further divided into zones managed by organizations that register the second-level domains. These organizations may decide to delegate authority for sub-zones within lower-level domains. Thus, there may be several name servers responsible for the different zones associated with a web address. DNSSEC requires a name server to determine not only that a particular web address exists, but also what falls just after it and prior to it in the zone.

Therefore, it is desirable to introduce an index structure that facilitates faster access to large main-memory databases while still retaining the ability to add and delete records from the index in real time.

SUMMARY

Disclosed embodiments provide a cache-sensitive index that also contains partial keys, as well as methods for maintaining such an index in real-time so that the index can be used for lookups that require the index to reflect live updates to the database. The index combines a cache-sensitive index and a partial key index to improve lookup speed. Each node of the index contains a pointer to a sub-group, fixed-size partial keys, and full key pointers. The node is configured so that the fixed-size partial keys fit in the first cache line. The full key pointers and key count take up the remaining space in the node, such that a node fits in two processor cache-lines.

An ordered index, such as the cache-sensitive index using partial keys described herein, is especially valuable for processes that require not only a lookup of a record in a database, but also a lookup of the "next" and possibly the "previous" entries once the record is found. For example, a DNSSEC proof may require that the DNS server locate not only a requested domain but also the "next" and "previous" domains sorted according to domain naming rules. An ordered index, such as the cache-sensitive index using partial keys, simplifies and expedites this type of operation by storing ordered index records contiguously in memory. Because a DNS server processes millions of requests per second, the cache-sensitive index using partial-keys dramatically increases response time for DNSSEC requests.

Consistent with disclosed embodiments, an index for a database is provided that comprises groups of nodes. The nodes of each group may be stored contiguously in memory. The nodes may comprise a child group pointer, a number of fixed size partial keys, and a number of full key pointers corresponding to the number of fixed size partial keys. The number of nodes in each group may be one higher than the number of fixed size partial keys in each node. The partial keys may fit in a cache line.

Consistent with disclosed embodiments, a method is provided for locating a search value in a database using such an index. The method may include computing a partial key for the search value and starting at the root node by setting a current node to the root node of the index, and the current key to the first partial key of the root node. The method may then repeat the steps of: (1) comparing the partial key of the search value to the current key; (2) when the search partial key is less than the current key, setting the current node to a node identified based on an offset added to the child group pointer of the current node and setting the current key to the first partial key of the identified node; (3) when the search partial key is greater than the current key, setting the current key to a next partial key of the current node, and (4) when the search partial key is equal to the current key, comparing the search value with a record value identified by the full key pointer corresponding to the current key. The method may involve repeating the steps until locating the search value in a leaf node or determining that no leaf node corresponds to the search value.

Consistent with other disclosed embodiments, a system for locating a search value in a database. The system may comprise a cache memory having a cache line size and storing an index comprising groups of nodes that comprise a child group pointer, a number of fixed size partial keys, and a number of full key pointers corresponding to the number of fixed size partial keys. The system may also comprise a processor; and a memory storing instructions that, when executed by the processor, cause the processor to perform operations. The operations may comprise computing a partial key for the search value and setting a current node to the root node and setting a current key to the first partial key of the root node. The operations may further comprise repeating the steps of: (1) comparing the partial key of the search value to the current key; (2) when the search partial key is less than the current key, setting the current node to a node identified based on an offset added to the child group pointer of the current node and setting the current key to the first partial key of the identified node; (3) when the search partial key is greater than the current key, setting the current key to a next partial key of the current node, and (4) when the search partial key is equal to the current key, comparing the search value with a record value identified by the full key pointer corresponding to the current key.

Consistent with other disclosed embodiments, computer-readable media, such as storage devices, may store program instructions that are executable by one or more processors to implement any of the methods, disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 9 is a pseudo-code example of a process for creating a sorted list of database records for the bulk-loading process, consistent with disclosed embodiments;

FIGS. 11A and 11B are a pseudo-code example of an ancestral key-copying process for creating non-leaf nodes during the bulk-load process, consistent with disclosed embodiments.

DESCRIPTION OF THE EMBODIMENTS

Disclosed embodiments provide methods and systems for implementing a cache-sensitive index that also uses partial-keys to improve data lookup times. A node in such an index include one pointer, as with a cache-sensitive B+ tree. In addition, the index includes partial keys to speed up comparison. In some embodiments, the partial keys of each node are configured to fit within a cache line, such as 64 bytes, so that traversing the partial keys does not require crossing a cache line. This also improves the look-up speed of the index.

In certain embodiments, the format of the partial key may be variable, such that the offset may take one or two bytes depending on the value of the offset. Because of the addition of partial keys to the cache-sensitive structure, prior solutions for deleting records from a cache-sensitive index by marking deleted records as deleted cannot be used. Thus, a method is provided for maintaining live updates of the cache-sensitive partial-key index, providing for live, physical deletion of records, and a bulk-loading method for a full reorganization of the index.

Reference will now be made in detail to exemplary embodiments, examples of which are illustrated in the accompanying drawings. Wherever convenient, the same reference numbers will be used throughout the drawings to refer to the same or like parts.

Figure 1:
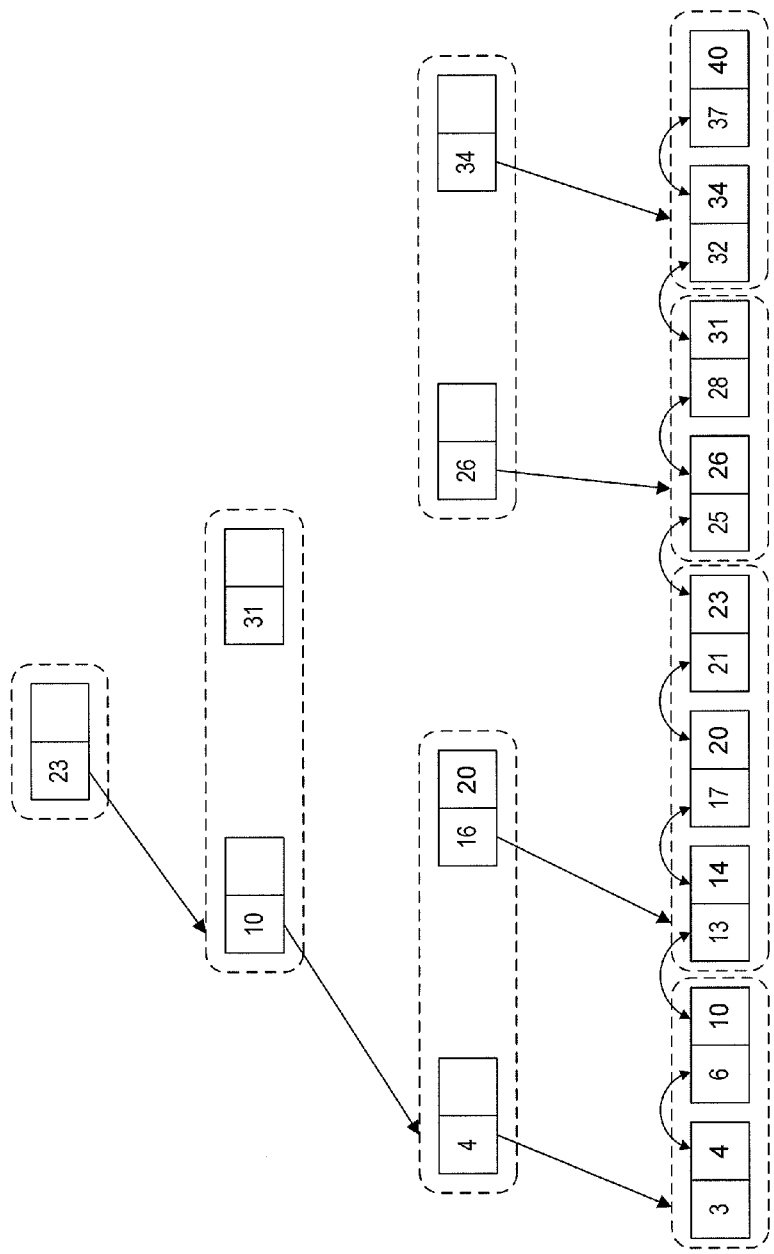
FIG. 1 is a diagram illustrating a cache-sensitive index, known in the prior art.
Figure 2:
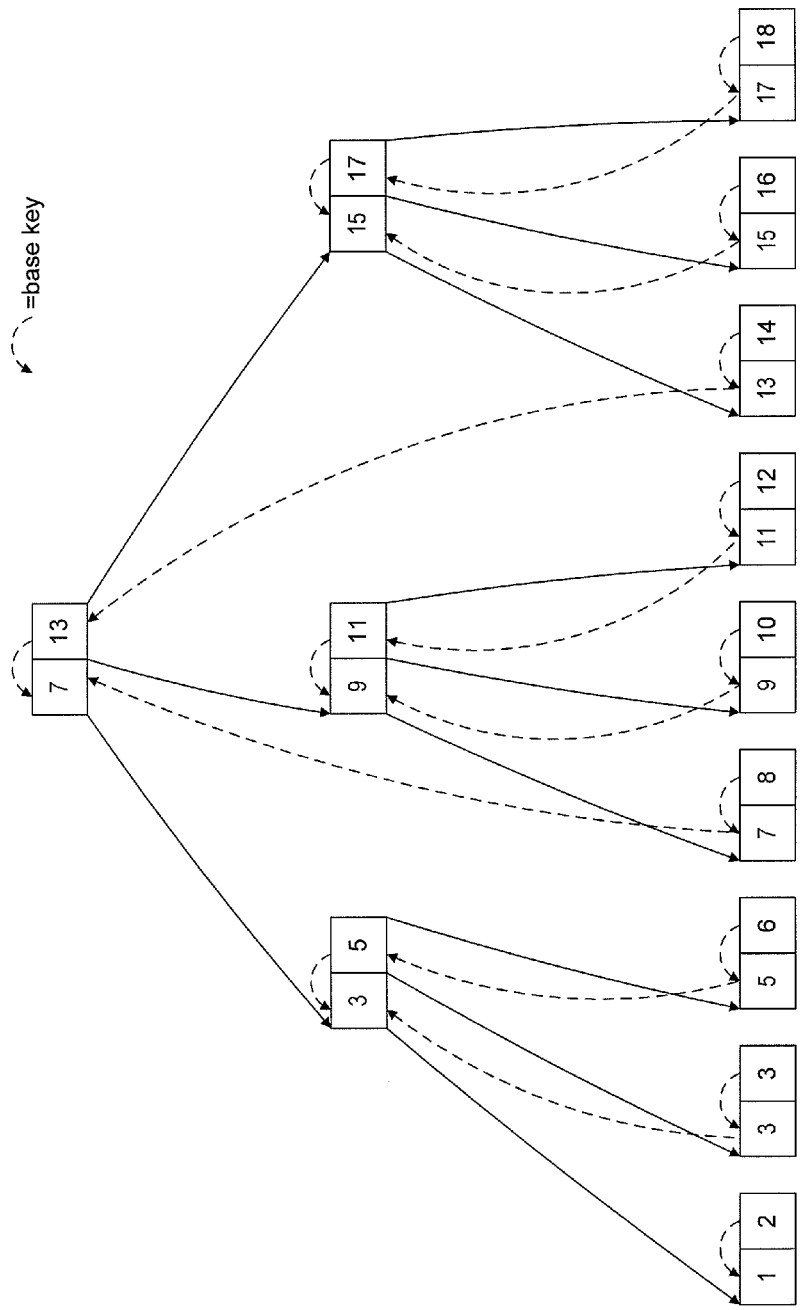
FIG. 2 is a diagram illustrating a fixed-size partial key index, known in the prior art.
Figure 3:
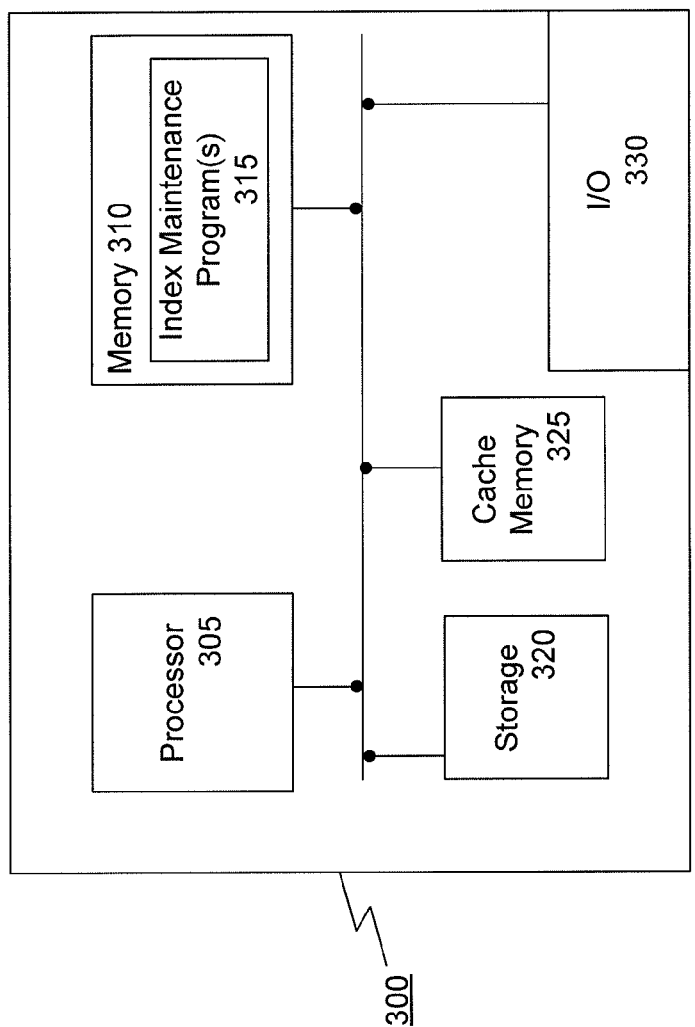
FIG. 3 is a diagram illustrating a computer system capable of implementing a cache-sensitive index using partial-keys, consistent with disclosed embodiments.

FIG. 3 is a diagram illustrating a computer system 300 capable of implementing disclosed embodiments, including exemplary system components. The components and arrangement, however, may be varied. Computer system 300 may include a processor 305, a memory 310, input/output (I/O) devices 330, cache memory 325, and storage 320. Computer system 300 may be implemented in various ways. For example, computer system 300 may be a general purpose computer, a server, a mainframe computer, or any combination of these components. Computer system 300 may communicate over a link with a network (not shown). For example, the link may be a direct communication link, a LAN, a WAN, or other suitable connection. The network may include the Internet. Computer system 300 may be standalone or it may be part of a subsystem, which may, in turn, be part of a larger system, such as a legacy name server system.

Processor 305 may include one or more known processing devices, such as a microprocessor from the Pentium™ or Xeon™ family manufactured by Intel™, the Turion™ family manufactured by AMD™, or any of various processors manufactured by Sun Microsystems. Memory 310 may include one or more storage devices, including main-memory devices, configured to store information used by processor 305 to perform certain functions related to disclosed embodiments. Storage 320 may include a volatile or non-volatile, magnetic, semiconductor, tape, optical, removable, nonremovable, or other type of storage device or computer-readable medium, including mass storage devices. Cache memory 325 may include L1 cache on the same chip as processor 302, static RAM, or dynamic RAM. Computer system 300 may store databases, as memory space permits, in whole or in part in a main memory system such as memory 310.

In one embodiment, memory 310 may include one or more index maintenance programs or subprograms 315 loaded from storage 320 or elsewhere that, when executed by central repository server 120, perform various procedures, operations, or processes consistent with disclosed embodiments. For example, memory 310 may include a bulk loading program that periodically rebuilds the entire cache-sensitive, partial-key index; a deletion program that facilitates live deletions from the cache-sensitive, partial-key index; an insertion program that facilitates live additions to the cache-sensitive, partial-key index; and an integrative support program that links the other programs and allows them to use a common database, provides a common user interface for setting system parameters, performs basic bookkeeping tasks, and provides guidance and help. Memory 310 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 310 may be configured with a index maintenance program 315 that performs several functions when executed by processor 305. For example, memory 310 may include a single program 315 that performs the index maintenance functions, or program 315 could comprise multiple programs. Moreover, processor 305 may execute one or more programs located remotely from computer system 300. For example, computer system 300 may access one or more remote programs that, when executed, perform functions related to disclosed embodiments.

Memory 310 may be also be configured with an operating system (not shown) that performs several functions well known in the art when executed by processor 305. By way of example, the operating system may be Microsoft Windows™, Unix™, Linux™, Solaris™, or some other operating system. The choice of operating system, and even to the use of an operating system, is not critical to any embodiment.

Computer system 300 may include one or more I/O devices 330 that allow data to be received and/or transmitted by computer system 300. I/O 330 devices may also include one or more digital and/or analog communication input/output devices that allow computer system 300 to communicate with other machines and devices, such as a user's computing device or some other a client computer (not shown). Client computers may provide requests from users representing queries of the data stored in storage 320 or memory 310. Computer system 300 may receive data from external machines and devices and output data to external machines and devices via I/O devices 330. The configuration and number of input and/or output devices incorporated in I/O devices 330 may vary as appropriate for certain embodiments.

Computer system 300 may include one or more databases that store information and are access and/or managed through computer system 300. The databases may be stored in storage 320 or memory 310. The databases may include, for example, data and information related to domain names, IP addresses, and other information needed to process a DNSSEC request. In some embodiments, the databases or other files may include data similar to the items shown in FIG. 4. Systems and methods of disclosed embodiments, however, are not limited to separate databases.

Figure 4:
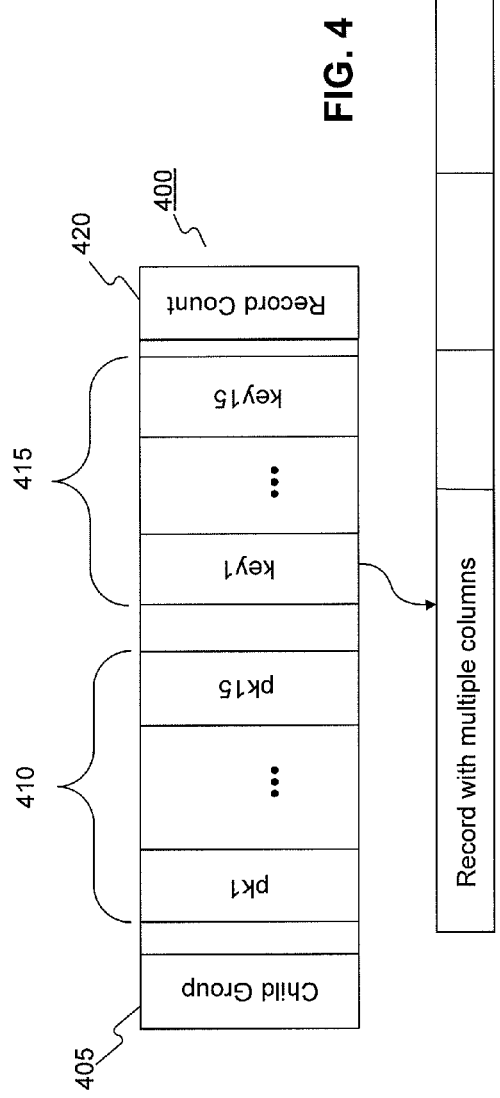
FIG. 4 is a diagram illustrating a node of a cache-sensitive index using fixed-size partial keys, consistent with disclosed embodiments.

FIG. 4 is a diagram illustrating a node 400 for a cache-sensitive index using fixed-size partial keys, consistent with disclosed embodiments. Node 400 may be a root, intermediate, or leaf node. Node 400 may include child group pointer 405. Child group pointer 405 may be a downlink pointer to a child group. As discussed above, a group is a collection of nodes stored contiguously in memory. Child group pointer 405 may contain the address of the first node in the group of nodes. The location of the remaining nodes may be calculated by adding the size of each node to the address of the pointer.

Node 400 may also contain partial keys 410. In certain embodiments, partial keys 410 comprise 4 bytes, the 4 bytes representing two distinct pieces of information: 1) the starting position from the base key where the bytes begin to differ (i.e. the offset); and 2) the first two or three bytes of the key itself (key data). Although fixed in size, the number of bytes used by the offset and the key data may vary. For example, if the starting position from the base key occurs within the first 254 bytes, then the offset may use one byte and the key data may use three bytes of the partial key. On the other hand, when the starting position from the base key occurs at or beyond the $254^{th}$ position, the offset may use two bytes and the key data may use two bytes. The variable format of the partial key allows the key data to consume more bytes in most cases, decreasing the amount of time a search key will match exactly a partial key. Traversing the index using the partial keys is explained in more detail with regard to FIG. 7 below.

In some embodiments all partial keys 410 of node 400 may be stored in the first block of node 400. In other words, child group pointer 405 and partial keys 410 fit within one cache line. This allows faster traversal of the partial keys because there is no possibility of a cache miss. Although FIG. 4 shows 15 partial keys 410 per node 400, any number of partial keys may be used, as long as the number of partial keys 410 fit in the first cache line. Therefore, the larger the cache line, the more partial keys 410 that may fit in a node 400. A smaller cache line may require that node 400 contain fewer partial keys 410 than shown in FIG. 4.

Node 400 may also include full key pointers 415. Full key pointers may be stored as part of node 400 for situations where the partial key completely matches the data that is the subject of a search. Full key pointers 415 point to a record (row) in the database, and make the full key available for comparison should a partial key comparison fail to resolve the query. The number of full key pointers 415 will match the number of partial keys 410 per node. Node 400 may also include record count 420. Record count 420 may indicate the number of partial keys 410 and full key pointers 415 that have data (i.e. are not null) and processor 305 may use record count 420 during a record insertion, deletion, or bulk load process.

The size of child group pointer 405 and full key pointers 415 may vary depending on the size of the database. For example, child group pointer 405 and full key pointers 415 may typically be four bytes long. In other embodiments, child group pointer 405 and full key pointers 415 may be eight bytes long, allowing for a larger maximum size for the database. The size of the pointers is not important, so long as enough bytes are used to accommodate the maximum size of the database and the size is consistent between all child group pointers 405 and full key pointers 415 within the index.

Figure 5:
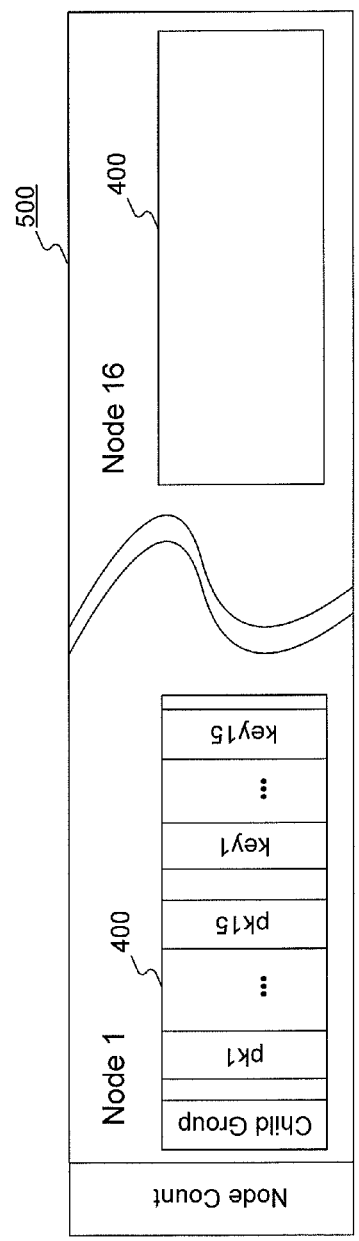
FIG. 5 is a diagram illustrating a node group for a cache-sensitive index using fixed-size partial keys, consistent with disclosed embodiments.

FIG. 5 is a diagram illustrating a node group 500, consistent with disclosed embodiments. Node group 500 is a collection of nodes 400 organized contiguously in memory to allow sub-tree pointers to be represented by child group pointer 405. Node group 500 may also include a node count that indicates the number of nodes 400 in the group that are populated with data (i.e. are not null). Processor 305 may use the node count during record insertion and deletion processes or the bulk loading process.

Figure 6:
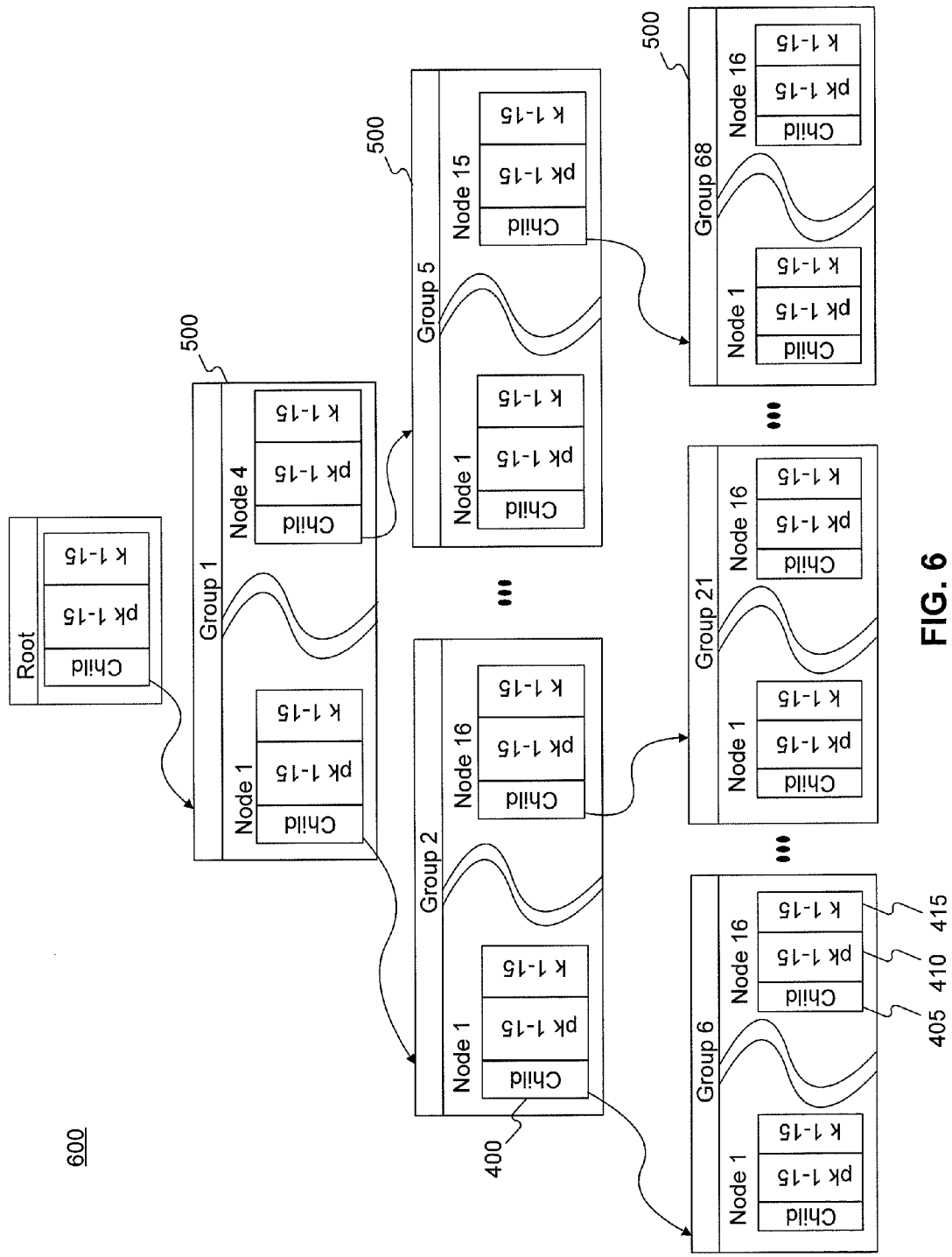
FIG. 6 is a diagram illustrating a tree representation of a cache-sensitive index using fixed-size partial keys, consistent with disclosed embodiments.

FIG. 6 is a diagram illustrating a tree representation of a cache-sensitive index 600 using partial keys, consistent with disclosed embodiments. Index 600 of FIG. 6 may represent an index tree for a database that contains 1,024 records. Each record in the database may be represented by a pointer in one of the leaf nodes. In the example of FIG. 6, Groups 6-68 contain the leaf nodes and Groups 1-5 contain intermediate nodes. Child group pointers 405 of each node in Groups 2-5 may contain the address of a group of leaf nodes. Child group pointer 405 of each node in Group 1 may contain the address of a group of intermediate nodes, e.g. Groups 2-5. The root of the tree may contain one node. The child group pointer 405 of the root node may point to one group, e.g. Group 1.

The number of nodes 400 that have data in Group 1 correspond to the number of partial keys 410 and full key pointers 415 that have data in the root node. In some embodiments, the number of nodes in the child group may be one higher than the number of keys in a node. In such embodiments, the number of nodes populated in the child group will be one higher than the number of keys populated. For example, if all keys in the root node are populated with data, then the tree may have sixteen nodes 400 in Group 1 populated with data. In such embodiments if a search key is greater than the last key in a root or intermediate node, then the next node searched is the rightmost node in the child group. In other embodiments, the number of nodes in the child group may equal the number of keys in a node. In the example of FIG. 6, which has one more node in each group than keys in the node, the root node has three keys populated so it's child group, Group 1, has four nodes populated. Similarly, Node 4 of Group 1 has 14 keys populated with data so its child group, Group 5, has 15 nodes 400 populated with data. Node 1 has all 15 keys populated with data so its child group, Group 2, has 16 nodes populated with data.

Figure 7:
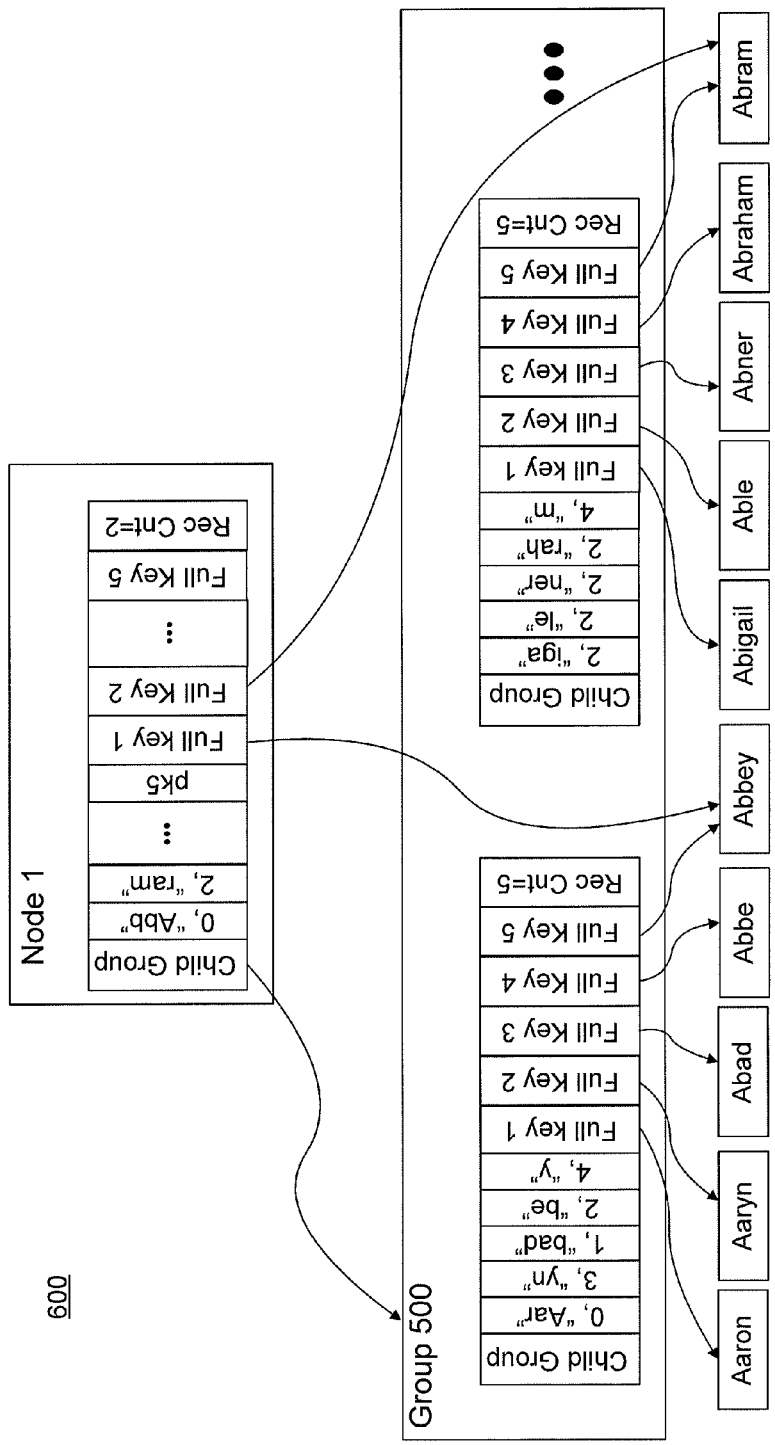
FIG. 7 is a diagram illustrating an example of a cache-sensitive index using fixed-size partial keys populated with index data, consistent with disclosed embodiments.

An example of traversing index 600 will now be explained using FIG. 7. Index 600 may be stored, for example, in cache memory 325 of system 300 and traversed using processor 305. In the example of FIG. 7, index 600 contains five keys per node and uses 4 byte addressing, so each node requires 48 bytes. Processor 305 may receive a search key and instructions to determine whether a record exists in a database that matches the search key. For example, processor 305 may receive the search key "Abner." Processor 305 may compute a partial search key, for example "0Abn," from the search key. For readability, FIG. 7 shows the partial key values in ASCII. However, to fit the three ASCII characters into four bytes, the data would be encoded as hexadecimal values. For example, "0Abn" may actually be stored as 0x0041626E.

Processor 305 may then compare the search key with the first partial key 410 of the root node of the index. In the example of FIG. 7, the Node 1 is the root node, and the first partial key contains "0Abb." Thus, processor 305 may compare the three letters of the search key starting at position zero with partial key 1.

Processor 305 may determine that the search key is greater than partial key 1 in the root node and, therefore, perform a comparison with partial key 2. When a search key is greater than a partial key, processor 305 may determine that a comparison with the next partial key in the node is required. To recompute the partial search key for comparison with the next partial key in the node, processor 305 may determine whether the first three bytes of the partial search key match the first three bytes of partial key 1 of the root node. If so, processor 305 may increase the offset of the partial search key by 2. If the first three bytes do not match, processor 305 may determine if the first two bytes match. If so, processor 305 may increase the offset by one. If only the first byte matches, which represents the offset, then processor 305 may not make an adjustment to the search partial key. In embodiments with a variable size partial key, when the increase to the offset causes the offset to exceed a predetermined limit, such as 250, processor 305 may adjust the key data portion of the partial key to use two bytes instead of three. Processor 305 may then adjust the key data in the partial search key according to the new offset, if needed. In the example of FIG. 7, processor 305 may determine that the first three bytes match (the three bytes including the offset), and add two to the offset, resulting in a new partial search key of "2ner."

Processor 305 may compare the partial search key with partial key 2 of the root node. Processor 305 may determine that the search key is less than partial key 2. When a search key is less than a partial key, the processor may determine that the next node to search corresponds with the child node of the partial key. For example, the child node of partial key 2 of the root node is the second node of the group identified by the child group pointer 405 of the root node. Processor 305 may determine the address of the child node by adding an offset to the value of child group pointer in Node 1. For example, because each node is 48 bytes long, the offset may be a multiple of 48.

Processor 305 may determine the amount of the offset by multiplying the absolute position of the partial key within the node by the node size. For example, the absolute position of the first partial key in a node is zero, the absolute position of the second partial key is one, etc. In the present example, processor 305 may determine that the offset is 48 because the absolute position of partial key 2 of the root node is one. Thus, processor 305 may calculate the address of the second node in the child group by adding 48 to the value of the child group pointer. Similarly, if processor 305 used partial key 4 of the root node in the comparison, processor 305 may determine that the offset is 144 (i.e. the absolute position of three multiplied by the node size of 48).

After calculating the address of the second node of the child group, and setting the current node to the second node of the child group, processor 305 may compare the value of the partial search key with the value of the first partial key of the current node, e.g. comparing "2ner" with "2iga." When processor 305 determines that the search key is greater than the first partial key, processor 305 may recompute the partial search key as discussed above. In the present example, processor 305 may not make any adjustment because only the first byte of the partial search key matches partial key 1 of the current node.

Processor 305 may then compare the partial search key with the second partial key of the current node, e.g. comparing "2ner" with "21e." When processor 305 determines that the search key is greater than the second partial key, processor 305 may determine that no adjustment is necessary to the partial key (because only the offset matches) and proceed to compare the partial search key with the third partial key of the current node. Because the partial keys match, processor 305 may perform a full key comparison, by retrieving the value of the full key. Processor 305 may retrieve the value "Abner," which is stored at the address represented by the third full key pointer of the current node. Because the search key matches the retrieved data, Processor 305 may determine that a record has been found, and may return the location of the retrieved record.

This example demonstrates how processor 305 never needed to do any expensive full key comparisons until the leaf node was found. All of the information required to traverse the index and determine the next child node is contained in partial keys 410.

In another example, processor 305 may receive a search key of "Abramo." As described above, processor 305 may compute a partial search key and compare the partial search key with the first partial key of the root node, e.g., comparing "0Abr" with "0Abb." Because the value of the search key is greater than the value of the first partial key, processor 305 may recompute the partial search key, adding two to the offset and adjusting the key data. Processor 305 may then compare the partial search key "2ram" to the second partial key of the root node "2ram." Because the search key matches the partial key, processor 305 must perform a full key comparison by retrieving the value of the data residing at the address in the second full key pointer. Processor 305 retrieves the record, e.g. "Abram," and compares "Abram" with "Abramo." Because the full key comparison shows the search key is greater, processor would continue with the next partial key. In the example of FIG. 7, the next partial key is null (empty).

In disclosed embodiments where the number of nodes in a group is one more than the number of keys in a node, this indicates that if Abramo exists in the tree, it will be in the right subtree (represented in FIG. 7 by the ellipsis after the second node). Processor 305 may not need to store a partial key or full key pointer in the root or intermediate nodes for the right subtree, as all searches beyond the last populated key must traverse down the right subtree. In other embodiments where the number of nodes in a group equals the number of keys in a node, if the next partial key is null (empty), this results in a determination that the search key does not exist in the database. Regardless of the embodiment used, if the next partial key did contain data, processor 305 would continue its search until either a record is found, or the processor determines that no leaf node matches the search key (i.e. no record exists in the database that matches the search key).

As discussed above, partial keys 410 may be encoded in a total byte ordered representation. This puts the most significant bytes in the beginning of the key and increases the speed of comparisons. However, data in the rows of the database may not be stored that way. In such an embodiment, processor 305 may need to dereference the full key before a comparison of the search key and the full key.

Figure 8:
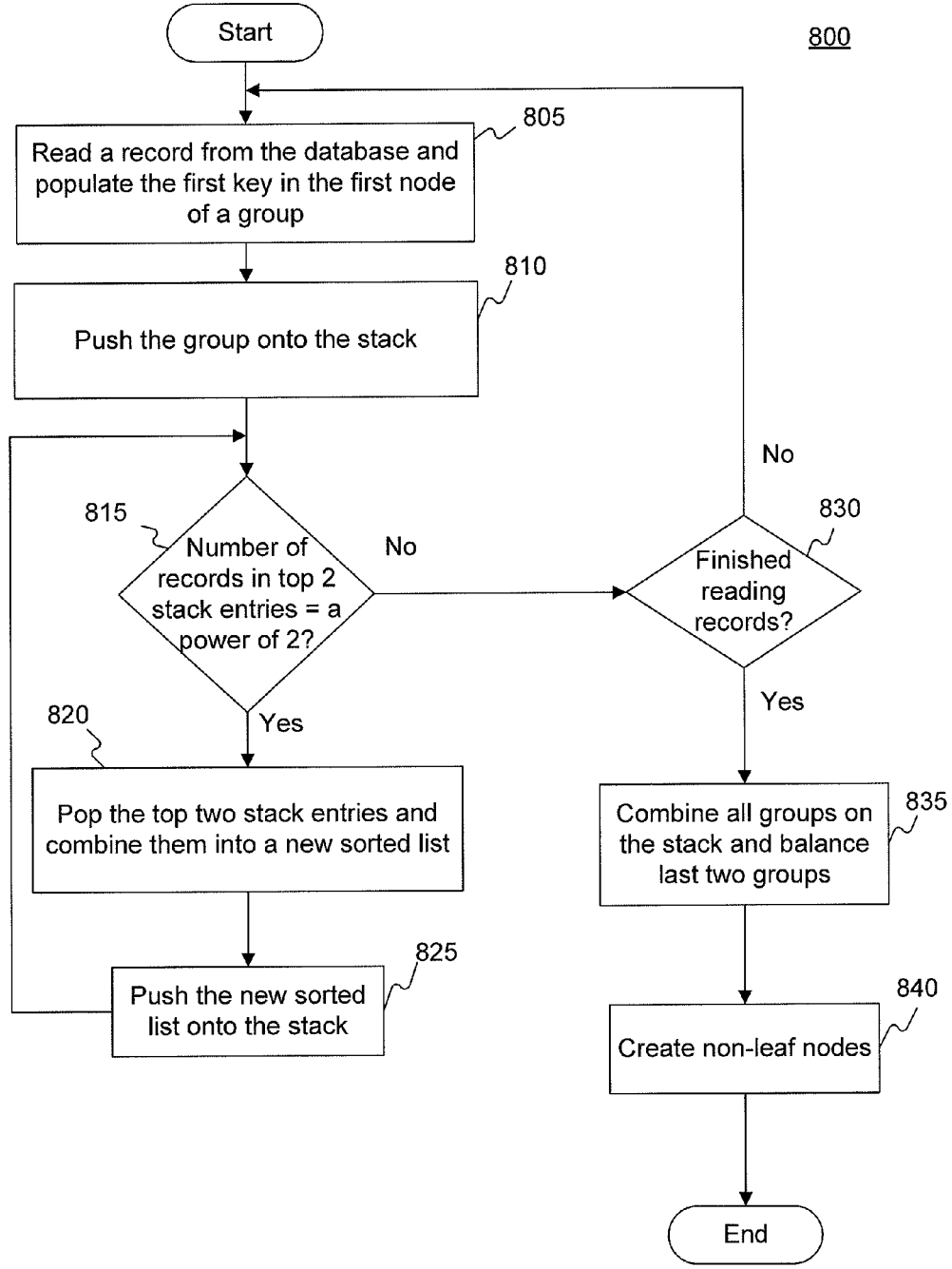
FIG. 8 is a flow diagram illustrating an exemplary process for bulk-loading a cache-sensitive index using fixed-size partial keys, consistent with disclosed embodiments.

FIG. 8 is a flow diagram illustrating an exemplary load process 800 for a cache-sensitive index using fixed size partial keys. Processor 305 may perform process 800 to rebuild the index as part of an operational procedure. A bulk load builds the index with completely full nodes to provide optimal read performance. For example, a B+ tree performs better with the nodes are full and balanced. In certain embodiments, process 800 may be implemented according to index maintenance programs 315 in memory 310. Process 800 may build all of the leaf nodes in a total sorted order first before building the higher level nodes in the tree. The leaf nodes may be sorted using a non-recursive merge sort that uses the partial keys, decreasing the load time.

In step 805, processor 305 reads a record from an input, such as a file, and populates the first key in the first node of a group. For example, as discussed with respect to FIGS. 4 and 5, in the first node of the group, the child group pointer 405 of the group is null (empty), and the first full key pointer 415 points to the record that processor 305 just read. The first partial key may contain an offset of zero and the first three bytes of the key of the record. Processor 305 may encode the partial key in a total byte order representation (big Endean). In step 810, processor 305 may push this group onto a stack. The stack stores groups, with the most recently added group at the top of the stack. Further, each group contains nodes, and each node contains a number of slots (partial keys and full key pointers). Each full key pointer represents one record.

In step 815, processor 305 determines whether the number of records (i.e. populated keys in the nodes of the group) in the top two stack entries form a power of two (e.g., 2, 4, 6, 8, 16, 32, . . . ). If the number of records does form a power of 2 (step 815, Yes), then processor 305 may pop the two stack entries and combine them into a new sorted list. For example, if the top two stack entries contain a group with three records (e.g., the first three keys of the first node are populated), and a group with one record (e.g., the first key of the first node is populated), then processor 305 may combine the two groups into a single, sorted group and push the newly sorted group onto the stack. FIG. 9 depicts pseudo-code for combining two entries into a new sorted list that may be used in some embodiments.

In some situations, the number of entries may fit in one group. In this situation, processor 305 may create one group for the sorted list. However, if the number of entries do not fit in one group, processor 305 may create the sorted list by linking groups of nodes. For example, if processor 305 combines a group with sixteen populated nodes (i.e. 240 records, if each node stores 15 keys and each group contains 16 nodes)

and a group with three populated nodes, the sorted list that results from the combination may comprise two groups of nodes, with the child group pointer of the first group containing the address of the second group. After this manner, the sorted list may contain a linked list of groups of nodes.

After processor 305 creates the new sorted list then, in step 825, the new sorted list is pushed onto the stack. The process then continues at step 815, where processor 305 checks to see if the number of records in the new sorted list and the number of records in the stack entry below the new sorted list form a power of two. If they do, processor 305 repeats steps 820 and 825. If the top two stack entries do not form a power of two then, in step 830, processor 305 determines if there are any more records left to read in the database. If so (step 830, No), processor 305 repeats steps 805-825 as needed.

If all records have been read (step 830, Yes) then, in step 835, processor 305 may combine all the groups on the stack, as discussed with regard to step 820, resulting in one sorted, linked-list of groups. Processor 305 may also balance the two groups at the end of the sorted list. For example, the final node may be less than half full of keys and the final group may be less than half full of nodes. When this occurs, processor 305 may rebalance the final nodes of the final group, or the final two groups of the linked list so that each group is at least half full of nodes, and each node is at least half full of keys. After completing step 835, processor 305 has created groups of nodes that may serve as leaf nodes in the cache-sensitive index using fixed size partial keys. In step 840, processor 305 creates the non-leaf nodes, such as the root and intermediate nodes.

Figure 10:
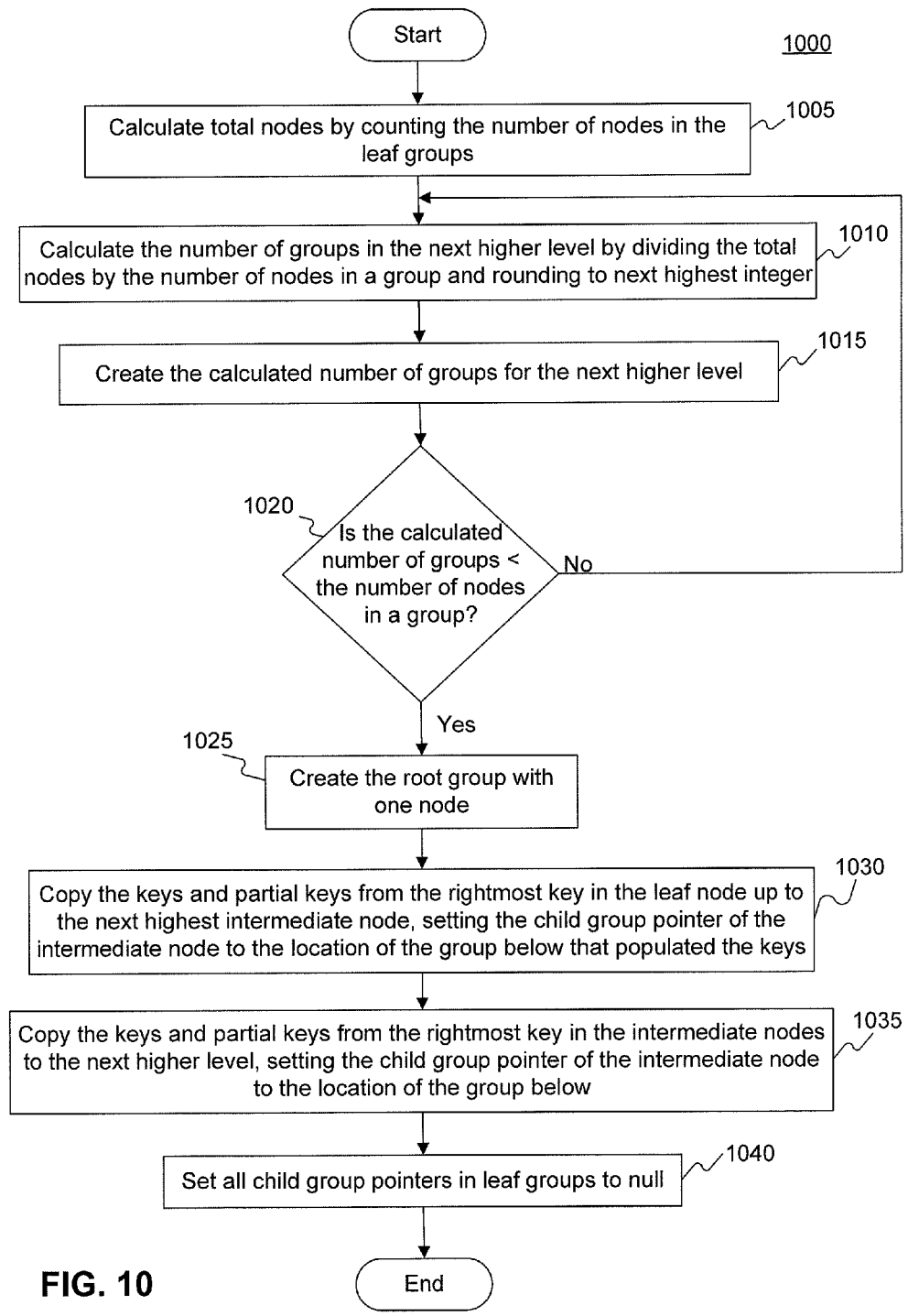
FIG. 10 is a flow diagram illustrating an exemplary process for creating non-leaf nodes during the bulk-load process, consistent with disclosed embodiments.

FIG. 10 is a flow diagram of a process 1000 that creates the non-leaf nodes during a bulk-loading process, consistent with disclosed embodiments. Processor 305 may perform process 1000 as part of step 840 of FIG. 8. In certain embodiments, process 1000 may be implemented according to index maintenance programs 315 in memory 310.

In step 1005, processor 305 may calculate the total nodes by counting the number of populated nodes in the sorted list of leaf groups. Processor 305 may have created the sorted list of leaf groups as part of process 800. In step 1010, processor 305 may calculate the number of groups in the next higher level by dividing the total nodes by the number of nodes in a group, rounding to the next highest number. For example, if the sorted list of leaf nodes contains 63 nodes, and each group contains 16 nodes, then processor 305 may determine that the level above the leaf nodes requires four groups (63/16=3.9, rounded up to 4). However, if processor 305 counts 1983 leaf nodes, then processor 305 may create 124 groups. In step 1015, processor 305 may create the groups in the next higher level by allocating memory for the groups and creating a linked list of the groups by setting the child group pointer of the first group to the address of the second group etc. Processor 305 may set all other values and pointers in the groups to zero (null). For purposes of discussion, this level may be L1 (the level above the leaf nodes).

Next, in step 1020, processor 305 determines whether the calculated number of groups (i.e. the number of groups just created) is less than the number of nodes in a group. If not (step 1020, No), processor 305 repeats steps 1010 and 1015 for higher layers in the tree. For example, using the example of 1983 leaf nodes discussed above, processor 305 created 124 groups in L1. Because 124 is greater than 16, processor 305 may repeat steps 1010-1020 for a higher layer, for example L2 (the level above L1). In this example, processor 305 may create 8 group nodes in L2, because 124/16=7.75, which is rounded up to 8.

If the calculated number of groups is less than the number of nodes in a group (step 1020, Yes) then, in step 1025, processor 305 creates a root group with one node. At this point, processor 305 has created all required groups for the index and must now populated the keys, partial keys, and down pointers of the non-leaf nodes. To accomplish this, in step 1030, processor 305 may iterate all of the leaf nodes and copy the keys and partial keys from the rightmost key in the leaf node up to the next highest non-leaf node. As processor 305 populates the first key in each node, processor 305 may set the child group pointer to the address of the group below that supplied the key value. FIG. 11A depicts pseudo-code for the leaf-node iteration that may be used in some embodiments.

In step 1035, processor 305 populates the nodes and groups of the higher level intermediate nodes, again copying the rightmost key in each node to next highest node, setting the child group pointers as described above with regard to step 1030. Processor 305 may repeat step 1035 until the keys of all intermediate levels, up to and including the root, have been populated. FIG. 11B depicts pseudo-code for the non-leaf node iteration that may be used in some embodiments to perform the process of step 1035.

In step 1040, processor 305 may set all the child group pointers in the leaf groups to null, thereby breaking the links between the leaf nodes. When processor 305 traverses the index, a child group pointer of null indicates that the node is a leaf node and no further traversal is possible. Therefore, if processor 305 has not found a record in the index matching the search key and the child group pointer of the node is null, then no matching record exists.

Figure 12A:
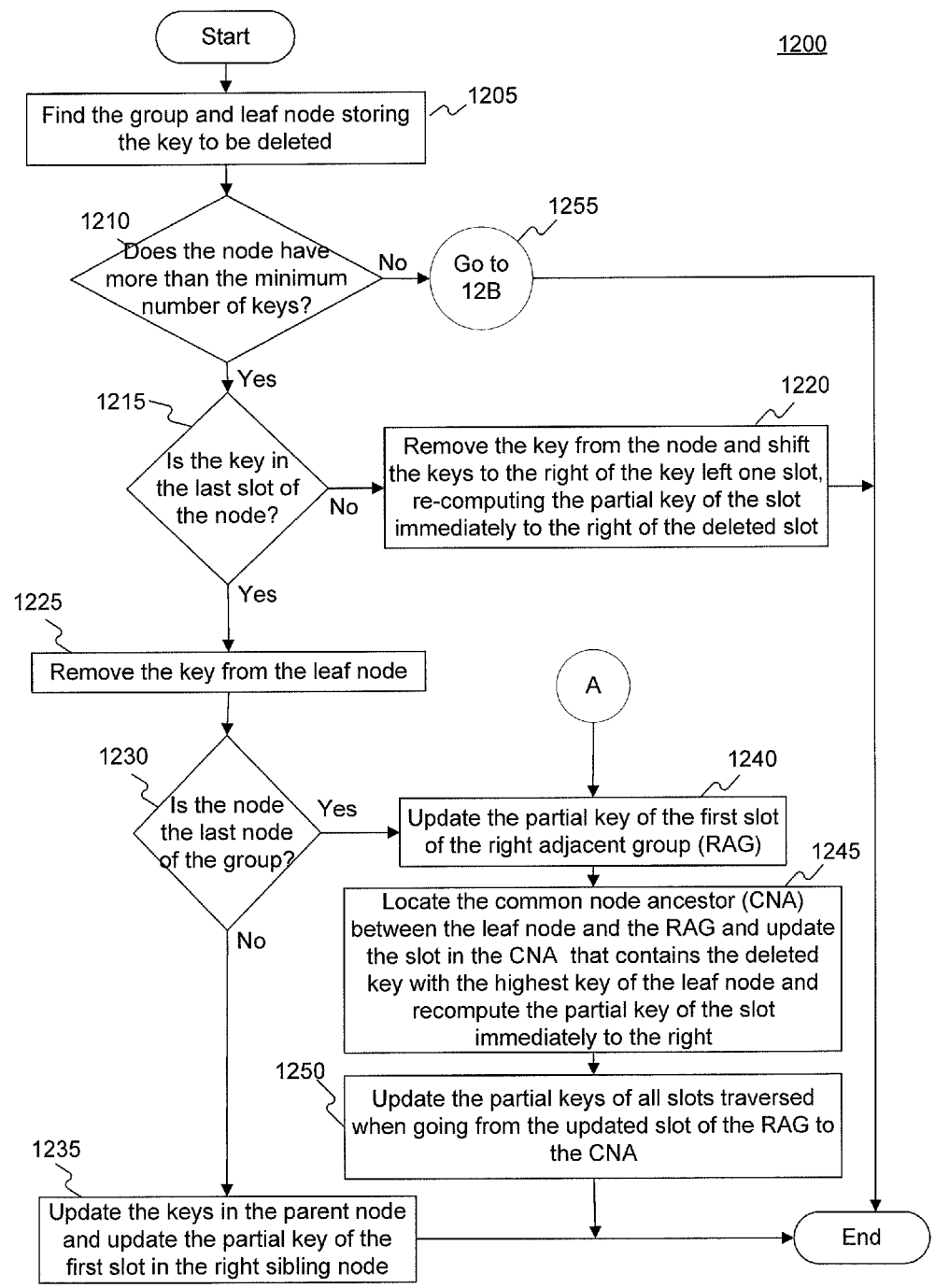
FIGS. 12A and 12B are flow diagrams illustrating an exemplary deletion process of a cache-sensitive index using fixed-size partial keys, consistent with disclosed embodiments.
Figure 12B:
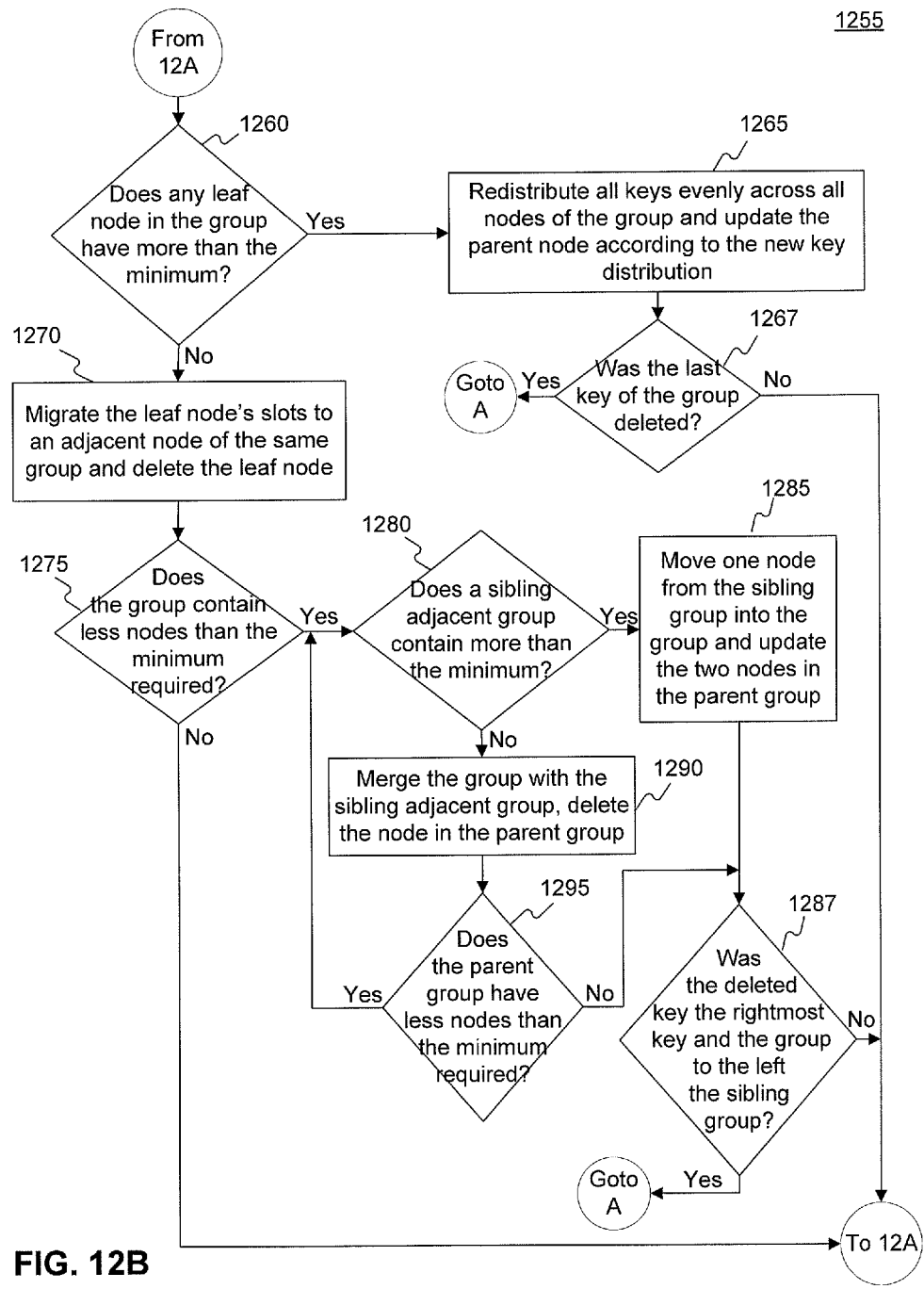

FIGS. 12A and 12B are flow diagrams illustrating an exemplary deletion process 1200 of a cache-sensitive index using fixed-size partial keys, consistent with disclosed embodiments. One challenge of maintaining a partial-key B+ tree is removal of deleted entries from the index. Prior solutions use a lazy deletion process that flags deleted entries in the index, leaving the node structure untouched until a clean-up process, such as a bulk load, is performed. Lazy deletion, however, leads to lookup speed degradation and poor space usage in a cache-sensitive index. Process 1200 offers a live-update solution for the deletion problem. Before process 1200 begins, processor 305 may receive a key to be deleted. This may be known as the target key. In certain embodiments, process 1200 may be implemented according to index maintenance programs 315 in memory 310.

At Step 1205, processor 305 finds the group (i.e. the target group) and the leaf node (i.e. the target node) that store the key to be deleted. Processor 305 may find the target node by traversing the index as discussed above with regard to FIG. 7. Once processor 305 finds the target node, in step 1210 processor 305 determines whether the target nodes has more than the minimum number of keys. In a B+ tree structure, each node except the root node should be at least half full. Thus, in the example of a node having 15 keys, the minimum number of keys is seven. If the target node does not have the minimum number of keys (step 1210, No), then processing continues at 1255, which will be discussed in more detail with regard to FIG. 12B.

If the target node does have more than the minimum number of keys (step 1210, Yes), then in step 1215 processor 305 determines whether the target key occupies the last slot of the target node. As used herein, a slot represents a partial key and its corresponding full key pointer. If the target key is not in the last slot (step 1215, No) then, in step 1220 processor 305 may remove the target key from the target node and shift the keys to the right of the target key one slot to the left. After shifting the keys to the left, processor 305 may re-compute the partial key of the slot that had been immediately to the right of the target key. Processor 305 has then completed the deletion, and process 1200 ends.

If the target key occupies the last slot in the target node (step 1215, Yes) then, in step 1225, processor 305 may remove the target key from the target node. This causes the formerly penultimate slot to become the new last key for the target node. After removing the target key, in step 1230, processor 305 may determine whether the target node is the last node of the target group. The last node in a group is the rightmost node that contains data. For example, if a group can have 15 nodes, but five of the nodes are empty, then the tenth node is the last node of the group.

If the node is not the last node of the target group (step 1230, No), then in step 1235 processor 305 updates the keys in the parent node and updates the partial key of the first slot in the node to the right of the target node (i.e. the right sibling node). Processor 305 may update the partial key of the right sibling node to reflect a new offset and new key data when compared with the new last key (in the formerly penultimate slot). Furthermore, because the slots in the parent node contain the value of the key in the last slot of each child node, processor 305 must copy the new last key of the target node to the corresponding slot in the parent node, adjusting the partial key of the updated slot in the parent and the partial key to the right of the updated slot in the parent node. Processor 305 has then completed the deletion and process 1200 ends.

If the node is the last node of the target group (step 1230, Yes) then, in step 1240, processor 305 updates the partial key of the first slot of the group to the right of the target group (i.e. the right adjacent group or "RAG"). If there is no right adjacent group (i.e. the deleted key is the highest key of the tree), then processor 305 has finished the delete and process 1200 ends. The partial key of the RAG will be adjusted in the same manner as described with regard to the right sibling node, as described above with respect to step 1235.

In step 1245, processor 305 may locate the common node ancestor ("CNA") of the target node and the RAG. The common node ancestor is the last node in the path from the root node to the leaf node that is common to both the target node and the first node of the RAG. Once processor 305 has located the CNA, processor 305 may update the slot in the CNA that contains the target key (because the target key was the last slot in the target node). Processor 305 may use the formerly penultimate slot of the target to update the slot in the CNA. After updating the slot in the CNA, processor 305 may then re-compute the partial key of the slot in the CNA immediately to the right of the updated slot. In step 1250, processor 305 may update the partial keys of all the nodes traversed when traversing the tree from the updated slot of the CNA to the RAG. Processor 305 has then completed the deletion and process 1200 ends.

FIG. 12B represents process 1255, which processor 305 performs when the target node does not have more than the minimum number of keys (step 1210, No). To ensure the index tree is balanced, the target node cannot be left with less than the minimum number of keys after deletion of the target key. Because of this, the nodes must be rebalanced after deletion of the target key. In step 1260, processor 305 determines if any node in the target group contains more than the minimum number of slots. If at least one other node in the target group has more than the minimum number of slots (step 1260, Yes) then, in step 1265, processor 305 redistributes the slots evenly across all nodes of the target group and updates the parent node according to the new key distribution. Processor 305 may also need to update grandparent nodes to reflect the new distribution. If the target key was the last key of the target group (step 1267, Yes), then processor 305 will perform steps 1240 to 1250, as described above with regard to FIG. 12A, to adjust the keys in the RAG and CNA. If the target key was not the last key of the target group (step 1267, No), processor 305 has completed the deletion and process 1200 ends.

If no nodes in the target group contain more than the minimum number of keys then, in step 1270, processor 305 migrates the target node's slots to an adjacent node of the target group and deletes the target node. Because none of the group's nodes contain more than the minimum number, any node in the group can fit the slots of the target node. Once the target node is deleted, processor 305 determines whether the target group now contains less nodes than the minimum required nodes. For example, when a node may have a maximum of 15 keys and a minimum of 7 keys, each group may have at most 16 nodes and at least 8 nodes. If the number of nodes falls below the minimum number, the nodes of the adjacent groups should be redistributed to keep the tree balanced.

If the target group, after deletion of the target node, contains more nodes than the minimum required (step 1275, No) then, processor 305 has finished the deletion and process 1200 ends. If the target group contains less than the minimum number of nodes after deletion of the target node (step 1275, Yes) then processor 305 determines whether an adjacent sibling group (i.e. "sibling groups" immediately to the left or to the right) contains more than the minimum number of nodes. If one of the sibling groups does contain more than the minimum number of nodes (step 1280, Yes) then, at step 1285, processor 305 moves one of the nodes from the sibling group into the target group. Processor 305 then updates the two slots in the parent node and potentially slots in the grandparent node. After updating all appropriate slots then, in step 1287, processor 305 determines whether the target key was the rightmost key of the target group and if so, whether the migrated node came from the left sibling group. If both answers are yes (step 1287, Yes), then processor 305 performs steps 1240-1250, as explained above. If not (step 1287, No), then processor 305 has finished the deletion and process 1200 ends.

If none of the sibling groups contain more than the minimum number of nodes (step 1280, No) then, in step 1290, processor merges the target group with a sibling adjacent group. This causes processor 305 to delete one node in the parent group and update the grandparent node. After merging the two groups, processor 305 may determine whether the parent group, with the node deleted, now contains less than the minimum number of nodes. If so (step 1295, Yes), then processor 305 may perform steps 1280, 1285, 1287, 1290, and 1295, as appropriate, using the parent group as the "target group."

If the parent group does have the minimum number of nodes required (step 1295, No), then processor 305 returns to step 1287 to determine whether the target group was merged with the left sibling group and the target key the rightmost key of the target group before deletion. If so (step 1287, Yes), processor 305 repeats steps 1240-1250. If not (step 1287, No), processor 305 has finished the deletion and process 1200 ends.

While process 1200 was described as a process of removing keys from nodes and adjusting nodes up the tree, in order to obtain transactional behavior, processor 305 must perform any changes to a node in a single atomic step. Changing two items in a node, such as a partial key and a full key pointer, is non-atomic. To accommodate such non-atomic changes, processor 305 may make a copy of the leaf group, execute process 1200 to make the changes in the copy, and swap in the new group after completing the changes by updating the child group pointer of the parent node. In more complex updates, the processor may copy subtrees of the index up until a common ancestor and swap in the entire subtree after all changes have been made.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A computer-implemented method of locating a search value in a database, the database having an index comprising groups of nodes, wherein each node comprises: a child group pointer, a number of fixed size partial keys, and a number of full key pointers corresponding to the number of fixed size partial keys, the method comprising:
    computing a search value partial key for the search value, wherein the search value partial key is a fixed size and comprises a first byte offset and a subset of the search value;
    setting a current node to a root node and setting a current partial key to a first partial key of the root node, wherein the first partial key of the root node is the fixed size and comprises the first byte offset and a subset of a key referenced by a first full key pointer of the root node; and
    comparing the search value partial key to the current partial key, wherein the comparing comprises;
        when the search value partial key is less than the current partial key, setting the current node to a node referenced by a child group pointer of the current node and setting the current partial key to a first partial key of the identified node, wherein the first partial key of the identified node comprises a second byte offset and a subset of a key referenced by a first full key pointer of the identified node,
        when the search value partial key is greater than the current partial key, setting the current partial key to a next partial key of the current node, wherein the next partial key of the current node is the fixed size and comprises a third byte offset and a subset of a key referenced by a next full key pointer of the current node,
        when the search value partial key is equal to the current partial key, comparing the search value with a key referenced by a full key pointer corresponding to the current partial key, and
        determining that the search value matches the key referenced by the full key pointer; and
    outputting a record value corresponding to the key referenced by the full key pointer in response to the determining.

2. The computer-implemented method of claim 1, wherein the node referenced by the child group pointer is identified based on an offset and the offset comprises a node size multiplied by a position of the current partial key within the current node.

3. The computer-implemented method of claim 1, wherein when the search value is greater than the key referenced by the full key pointer corresponding to the current partial key, the method further comprises performing the setting of the current partial key to the next partial key of the current node.

4. The computer-implemented method of claim 1, wherein when the search value is less than the key referenced by the full key pointer corresponding to the current partial key, the method further comprises performing the setting of the current node to the node referenced by the child group pointer of the current node and the setting of the current partial key to the first partial key of the identified node.

5. The computer-implemented method of claim 1, wherein when the search value partial key is greater than the current partial key, the method further comprises recalculating the search value partial key.

6. The computer-implemented method of claim 5, wherein recalculating the search value partial key comprises:
    calculating a new byte offset by:
        adding two to the first byte offset when the first three bytes of the search value partial key match the first three bytes of the current partial key, and
        adding one to the first byte offset when the first two bytes of the search value partial key match the first two bytes of the current partial key; and
    adjusting the subset of the search value according to the new byte offset.

7. The computer-implemented method of claim 6, wherein when the new byte offset exceeds a predetermined value, the new byte offset comprises an additional byte and the subset of the search value comprises one less byte.

8. The computer-implemented method of claim 1 further comprising:
    determining that the search value is not located in the database based on the comparing the search value partial key to the current partial key; and outputting an indication that the search value is not located in the database in response to the determining.

9. A computer readable medium storing instructions for causing a processor to perform the computer-implemented method of claim 1.

10. A system for locating a search value in a database, comprising:
   a cache memory having a cache line size and storing an index comprising groups of nodes, wherein each node of the groups of nodes comprises:
      a child group pointer,
      a number of fixed size partial keys, and
      a number of full key pointers corresponding to the number of fixed size partial keys;
   a processor; and
   a memory storing instructions that, when executed by the processor, cause the processor to perform operations comprising:
      computing a search value partial key for the search value, wherein the search value partial key is a fixed size and comprises a first byte offset and a subset of the search value;
      setting a current node to a root node and setting a current partial key to a first partial key of the root node, wherein the first partial key of the root node is the fixed size and comprises the first byte offset and a subset of a key referenced by a first full key pointer of the root node; and
      comparing the search value partial key to the current partial key, wherein the comparing comprises;
         when the search value partial key is less than the current partial key, setting the current node to a node referenced by a child group pointer of the current node and setting the current partial key to a first partial key of the identified node, wherein the first partial key of the identified node comprises a second byte offset and a subset of a key referenced by a first full key pointer of the identified node,
         when the search value partial key is greater than the current partial key, setting the current partial key to a next partial key of the current node, wherein the next partial key of the current node is the fixed size and comprises a third byte offset and a subset of a key referenced by a next full key pointer of the current node,
         when the search value partial key is equal to the current partial key, comparing the search value with a key referenced by a full key pointer corresponding to the current partial key, and
         determining that the search value matches the key referenced by the full key pointer; and
      outputting a record value corresponding to the key referenced by the full key pointer in response to the determining.

11. The system of claim 10, wherein the child group pointer and the number of fixed size partial keys fit in a cache line of the cache line size.

12. The system of claim 10, wherein nodes of each group of nodes are stored contiguously in the cache memory.

13. The system of claim 12, wherein the node referenced by the child group pointer is identified based on an offset and the offset comprises a node size multiplied by a position of the current partial key within the current node.

14. The system of claim 10, wherein when the search value is greater than the key referenced by the full key pointer corresponding to the current partial key, the operations further comprise performing the setting of the current partial key to the next partial key of the current node.

15. The system of claim 10, wherein when the search value is less than the key referenced by the full key pointer corresponding to the current partial key, the operations further comprise performing the setting of the current node to the node referenced by the child group pointer of the current node and the setting of the current partial key to the first partial key of the identified node.

16. The system of claim 10, wherein when the search value partial key is greater than the current partial key, the operations further comprise recalculating the search value partial key.

17. The system of claim 16, wherein the operation of recalculating the search value partial key comprises:
   calculating a new byte offset by:
      adding two to the first byte offset when the first three bytes of the search value partial key match the first three bytes of the current partial key, and
      adding one to the first byte offset when the first two bytes of the search value partial key match the first two bytes of the current partial key; and
   adjusting the subset of the search value according to the new byte offset.

18. The system of claim 17, wherein when the new byte offset exceeds a predetermined value, the new byte offset comprises an additional byte and the subset of the search value comprises one less byte.

19. The system of claim 10, wherein each group of nodes of the groups of nodes comprises a number of nodes, the number of nodes being one more than the number of fixed size partial keys.

20. The system of claim 10, the operations further comprising:
   determining that the search value is not located in the database based on the comparing the search value partial key to the current partial key; and
   outputting an indication that the search value is not located in the database in response to the determining.

21. A non-transitory computer-readable storage medium for locating a search value in a database, comprising:
   a cache memory having a cache line size and storing an index comprising groups of nodes, wherein each node of the groups of nodes comprises:
      a child group pointer,
      a number of fixed size partial keys, and
      a number of full key pointers corresponding to the number of fixed size partial keys; and
   instructions which, when executed on a processor, perform a method comprising:
      computing a search value partial key for the search value, wherein the search value partial key is a fixed size and comprises a first byte offset and a subset of the search value;
      setting a current node to a root node and setting a current partial key to a first partial key of the root node, wherein the first partial key of the root node is the fixed size and comprises the first byte offset and a subset of a key referenced by a first full key pointer of the root node; and
      comparing the search value partial key to the current partial key, wherein the comparing comprises;
         when the search value partial key is less than the current partial key, setting the current node to a node referenced by a child group pointer of the current node and setting the current partial key to a first partial key of the identified node, wherein the first partial key of the identified node comprises a second byte offset and a subset of a key referenced by a first full key pointer of the identified node, when the search value partial key is greater than the current partial key, setting the current partial key to a next partial key of the current node, wherein the next partial key of the current node is the fixed size and comprises a third byte offset and a subset of a key referenced by a next full key pointer of the current node, when the search value partial key is equal to the current partial key, comparing the search value with a key referenced by a full key pointer corresponding to the current partial key, and determining that the search value matches the key referenced by the full key pointer; and outputting a record value corresponding to the key referenced by the full key pointer in response to the determining.

22. The non-transitory computer-readable storage medium of claim 21, wherein the node referenced by the child group pointer is identified based on an offset and the offset comprises a node size multiplied by a position of the current partial key within the current node.

23. The non-transitory computer-readable storage medium of claim 21, the method further comprising:

determining that the search value is not located in the database based on the comparing the search value partial key to the current partial key; and outputting an indication that the search value is not located in the database in response to the determining.

24. A computer-implemented method of locating a search value in a database, the database having an index comprising groups of nodes, wherein each node comprises: a child group pointer, a number of fixed size partial keys, and a number of full key pointers corresponding to the number of fixed size partial keys, the method comprising:

computing a search value partial key for the search value, wherein the search value partial key is a fixed size and comprises a first byte offset and a subset of the search value;

setting a current node to a root node and setting a current partial key to a first partial key of the root node, wherein the first partial key of the root node is the fixed size and comprises the first byte offset and a subset of a key referenced by a first full key pointer of the root node; and comparing the search value partial key to the current partial key, wherein the comparing comprises;

when the search value partial key is less than the current partial key, setting the current node to a node referenced by a child group pointer of the current node and setting the current partial key to a first partial key of the identified node, wherein the first partial key of the identified node comprises a second byte offset and a subset of a key referenced by a first full key pointer of the identified node, and when the search value partial key is greater than the current partial key, setting the current partial key to a next partial key of the current node, wherein the next partial key of the current node is the fixed size and comprises a third byte offset and a subset of a key referenced by a next full key pointer of the current node, determining that the search value is not located in the database based on the comparing; and outputting an indication that the search value is not located in the database in response to the determining.

* * * * *